(12) United States Patent
Piwonka et al.

(10) Patent No.: US 8,977,592 B2
(45) Date of Patent: *Mar. 10, 2015

(54) SYNCHRONIZATION FRAMEWORK THAT RESTORES A NODE FROM BACKUP

(71) Applicant: Microsoft Corporation, Redmond, WA (US)

(72) Inventors: Philip Daniel Piwonka, Seattle, WA (US); Lev Novik, Bellevue, WA (US); Sundarshan Chitre, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/153,045

(22) Filed: Jan. 12, 2014

(65) Prior Publication Data

US 2014/0143598 A1      May 22, 2014

Related U.S. Application Data

(63) Continuation of application No. 12/754,622, filed on Apr. 6, 2010, now Pat. No. 8,630,980.

(51) Int. Cl.
*G06F 17/00* (2006.01)
*G06F 11/14* (2006.01)
*G06F 17/30* (2006.01)

(52) U.S. Cl.
CPC ...... *G06F 11/1446* (2013.01); *G06F 17/30309* (2013.01); *G06F 11/14* (2013.01)
USPC ............................ 707/622; 707/610; 707/679

(58) Field of Classification Search
CPC .......... G06F 17/30575; G06F 11/1469; G06F 11/2082; G06F 3/067
USPC ........................................................ 707/622
See application file for complete search history.

(56) References Cited

U.S. PATENT DOCUMENTS 6,098,079 A     8/2000  Howard
6,438,705 B1    8/2002  Chao et al.
(Continued)

OTHER PUBLICATIONS

Ciglan Marek., "Replica delivery optimization and content synchronization in data grids", Institute of Informatics, Slovak Academy of Sciences, Retrieved at <<http://www.mobile-intelligence.com/oc04-rob.pdf>>, 2007, 113 pages.

(Continued)

*Primary Examiner* — Rehana Perveen
*Assistant Examiner* — Tiffany Thuy Bui
(74) *Attorney, Agent, or Firm* — Kate Drakos; David Andrews; Micky Minhas

(57) ABSTRACT

Architecture for restoring nodes. After restoring a node, fix-up occurs to make the node appear as a different node than before the restore operation. The node appears as a new node, which new node knows the data up to a certain point from when the new node had the prior identity. This enables new changes generated by the new node to flow to the other nodes in the topology, as well as have the changes that the prior identity sent to other nodes flow back to the new node. In other words, the architecture maintains information to create the new node in the topology while maintaining prior data knowledge. Additionally, item level metadata of associated data items is updated to correlate with the updated data items so that changes can be correctly enumerated and applied. This metadata update occurs across scopes of which the data items are included.

20 Claims, 9 Drawing Sheets

(56) References Cited

U.S. PATENT DOCUMENTS

| | | | |
|---|---|---|---|
| 6,445,678 | B1 | 9/2002 | Bard |
| 7,290,019 | B2 | 10/2007 | Bjorner et al. |
| 7,546,321 | B2 | 6/2009 | Uppala |
| 7,613,751 | B2 * | 11/2009 | Tom et al. ............... 707/999.202 |
| 2005/0086384 | A1 * | 4/2005 | Ernst ............................ 709/248 |
| 2005/0210081 | A1 | 9/2005 | Fleck et al. |
| 2006/0265434 | A1 | 11/2006 | Kathuria et al. |
| 2006/0271606 | A1 | 11/2006 | Tewksbary |
| 2007/0143375 | A1 | 6/2007 | Tom et al. |
| 2007/0220328 | A1 | 9/2007 | Liu et al. |
| 2007/0226277 | A1 * | 9/2007 | Holenstein et al. ........... 707/204 |
| 2007/0286097 | A1 | 12/2007 | Davies |
| 2008/0313497 | A1 | 12/2008 | Hirakawa et al. |
| 2009/0234872 | A1 | 9/2009 | Padgett |
| 2009/0276476 | A1 | 11/2009 | Jolly |
| 2010/0138395 | A1 * | 6/2010 | D'Souza et al. .............. 707/668 |

OTHER PUBLICATIONS

Chang, et al., "A Distributed P2P Network Based on Increasing Reliability and Scalability for Internet Applications", IWCMC '06, Retrieved at <<http://delivery.acm.org/10.1145/1150000/1143840/p1453-chang.pdf?key1=1143840&key2=3537504621&coll=GUIDE&dl=GUIDE&CFID=72372457&CFTOKEN=64033130>>, 2006, 6 pages.

Zondervan, et al., "Data Synchronization of Portable Mobile Devices in a Distributed Database System", Lotus Development Corporation, Retrieved at <<http://domino.watson.ibm.com/cambridge/research.nsf/0/c71ebac11ec6e54f8525661600797829/$FILE/mobile.pdf>>, 2004, 9 pages.

Synder, et al., "Robustness Infrastructure for Multi-Agent Systems", Proceedings, Open Cougaar 2004, Retrieved at <<http://www.mobile-intelligence.com/oc04-rob.pdf>>, 2004, 7 pages.

* cited by examiner

US 8,977,592 B2

SYNCHRONIZATION FRAMEWORK THAT RESTORES A NODE FROM BACKUP

CROSS-REFERENCE TO RELATED APPLICATIONS

This application is a continuation of co-pending Non-Provisional patent application Ser. No. 12/754,622, entitled "SYNCHRONIZATION FRAMEWORK THAT RESTORES A NODE FROM BACKUP", and filed Apr. 6, 2010, now U.S. Pat. No. 8,630,980, issued Jan. 14, 2014.

BACKGROUND

Data backup is essential to the individual user as well as to the corporate entity. Data stores can now be found on client machines as well as distributed corporate-wide across servers. Thus, consumers desire the capability to backup and restore both client-side databases as well as server-side database to guard against data loss related. Data loss can occur due to many reasons, some of which include database corruption, hardware failures, unintended operations, and disaster recovery.

Moreover, the behavior of client-side and server-side stores can be different and, as such, result in a different set of requirements related to backup/restore scenarios. Specifically, client-side stores typically share characteristics that include limited concurrency, single-user data access, flexibility during downtime, and limitations related to backup capabilities (e.g., online, incremental, etc.). In contrast, server-side databases typically share characteristics that include a high degree of concurrency, multi-user user data access, high availability, and a wide array of backup capabilities.

Endpoint synchronization is a challenging prospect. One technique involves synchronization by maintaining version information about the data being synchronized. When an endpoint needs to be restored from backup due to hardware or software failure, the version information for the data that lives on that node must be repaired to prevent post-restore changes from being missed when sending changes to clients. However, if a node is restored to a point in time that causes the local timestamp to go backward to a time prior, then the node creates "new" changes that have a version which will look old to clients that were synchronizing with this node prior to restore, causing non-convergence.

SUMMARY

The following presents a simplified summary in order to provide a basic understanding of some novel embodiments described herein. This summary is not an extensive overview, and it is not intended to identify key/critical elements or to delineate the scope thereof. Its sole purpose is to present some concepts in a simplified form as a prelude to the more detailed description that is presented later.

The disclosed architecture is a versioning solution for synchronizing endpoints. After restoring an endpoint some fix-up occurs to make that endpoint look like a different endpoint than before the restore operation. In this case, the endpoint looks like a new endpoint that knows the data from its prior identity up to a certain point. This allows for new changes generated by the new endpoint to flow to the other endpoints in the topology, as well as have the changes that the prior identity sent to other clients flow back to the new endpoint. More generally, node data of an original node is to be restored, the original node having an original identity. The original identity of the original node is changed to a new identity, where the new identity of the original node enables the original node to appear as a new node to other nodes, and the new node maintains the restored node data of the original node. Changes from the new node are synchronized to the other nodes and changes from the other nodes are synchronized to the new node based on the new identity.

In other words, the architecture maintains information to create the "new" node in the topology while maintaining prior knowledge. Additionally, item level metadata is updated to correlate with the updated knowledge so that changes can be correctly enumerated and applied.

To the accomplishment of the foregoing and related ends, certain illustrative aspects are described herein in connection with the following description and the annexed drawings. These aspects are indicative of the various ways in which the principles disclosed herein can be practiced and all aspects and equivalents thereof are intended to be within the scope of the claimed subject matter. Other advantages and novel features will become apparent from the following detailed description when considered in conjunction with the drawings.

DETAILED DESCRIPTION

Figure 1:
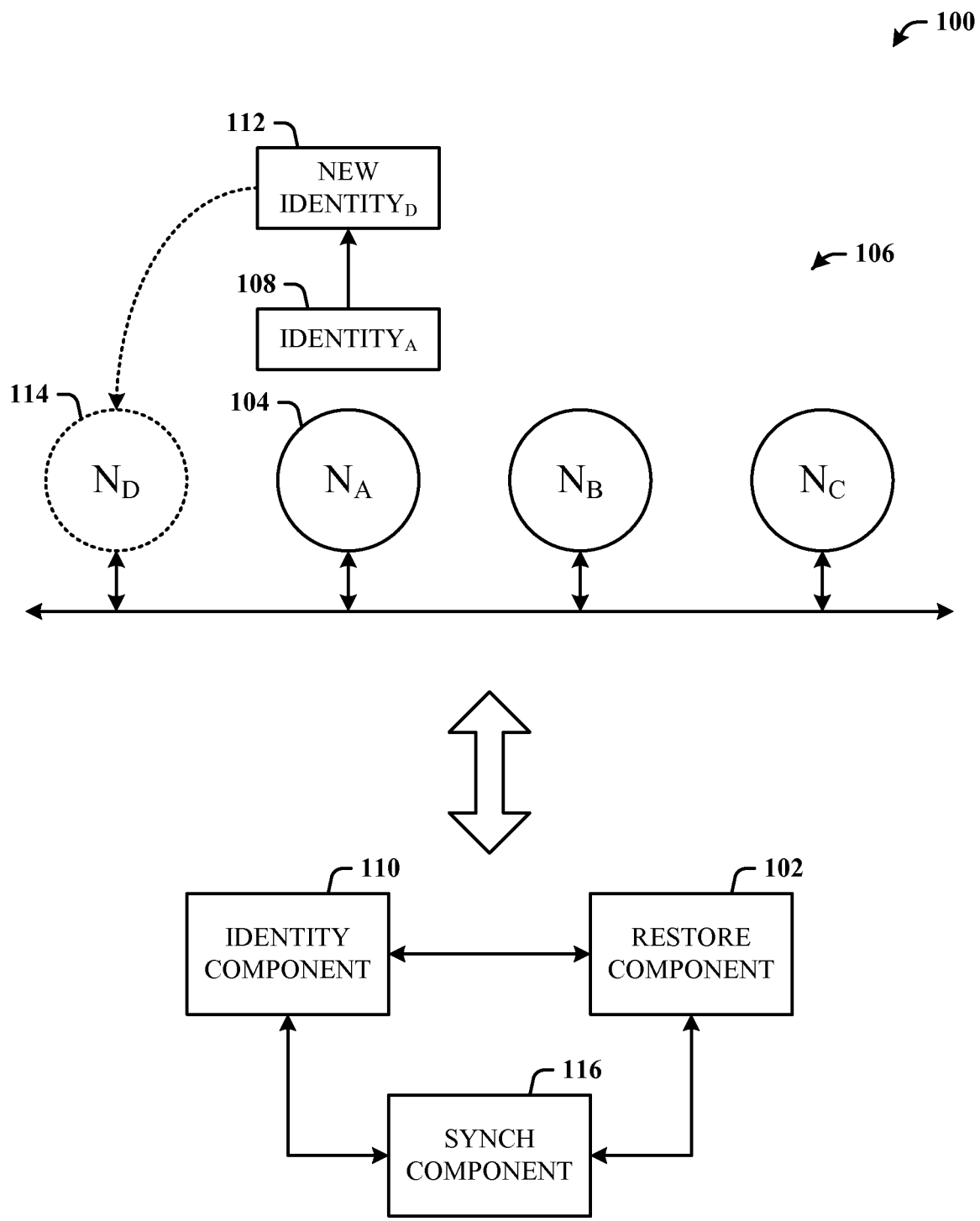
FIG. 1 illustrates a computer-implemented data restoration system in accordance with the disclosed architecture.

The disclosed architecture restores a node by changing the original node identity to a new identity (and hence, a new node), which triggers synchronization between some or all of the nodes of not only prior node data stored on the other nodes for pre-restore operations, but also node data associated with the new identity post-restore. This allows for new changes generated by the new node to flow to the other nodes in the topology, as well as have the changes that the original identity sent to other clients flow back to the new node.

Reference is now made to the drawings, wherein like reference numerals are used to refer to like elements throughout. In the following description, for purposes of explanation, numerous specific details are set forth in order to provide a thorough understanding thereof. It may be evident, however, that the novel embodiments can be practiced without these specific details. In other instances, well known structures and devices are shown in block diagram form in order to facilitate a description thereof. The intention is to cover all modifications, equivalents, and alternatives falling within the spirit and scope of the claimed subject matter.

FIG. 1 illustrates a computer-implemented data restoration system 100 in accordance with the disclosed architecture. The system 100 includes a restore component 102 that restores a node ($N_A$) 104 in a topology 106 to a restored state. The node 104 has a node identity 108. An identity component 110 changes the identity 108 of the node 104 to a new identity (New Identity) 112. Thus, the node 104 appears to the other nodes ($N_B$ and $N_C$) in the topology 106 as a new node ($N_D$) 114 based on the new identity 112. A synchronization component 116 synchronizes data from the other nodes ($N_B$ and $N_C$) to the node 104 (since it is actually the node 104 that has the new identity 112) based on the new identity 112 to bring the node 104 to an updated state.

The identity component 110 changes the identity 108 of the node 104 by increasing a local peer value of a key map associated with the node 104 and updating key maps of all topology nodes based on the new identity 112. The synchronization component 116 synchronizes data changes from the node 104 to the other nodes ($N_B$ and $N_C$) and synchronizes changes from the other nodes ($N_B$ and $N_C$) to the node 104 based on the new identity 112. The new identity 112 is created as an incremental increase in a local peer value and new node identifier. The restore component 102 restores data item metadata based on the restored node 104, and data item metadata across scopes that include the data item.

Figure 2:
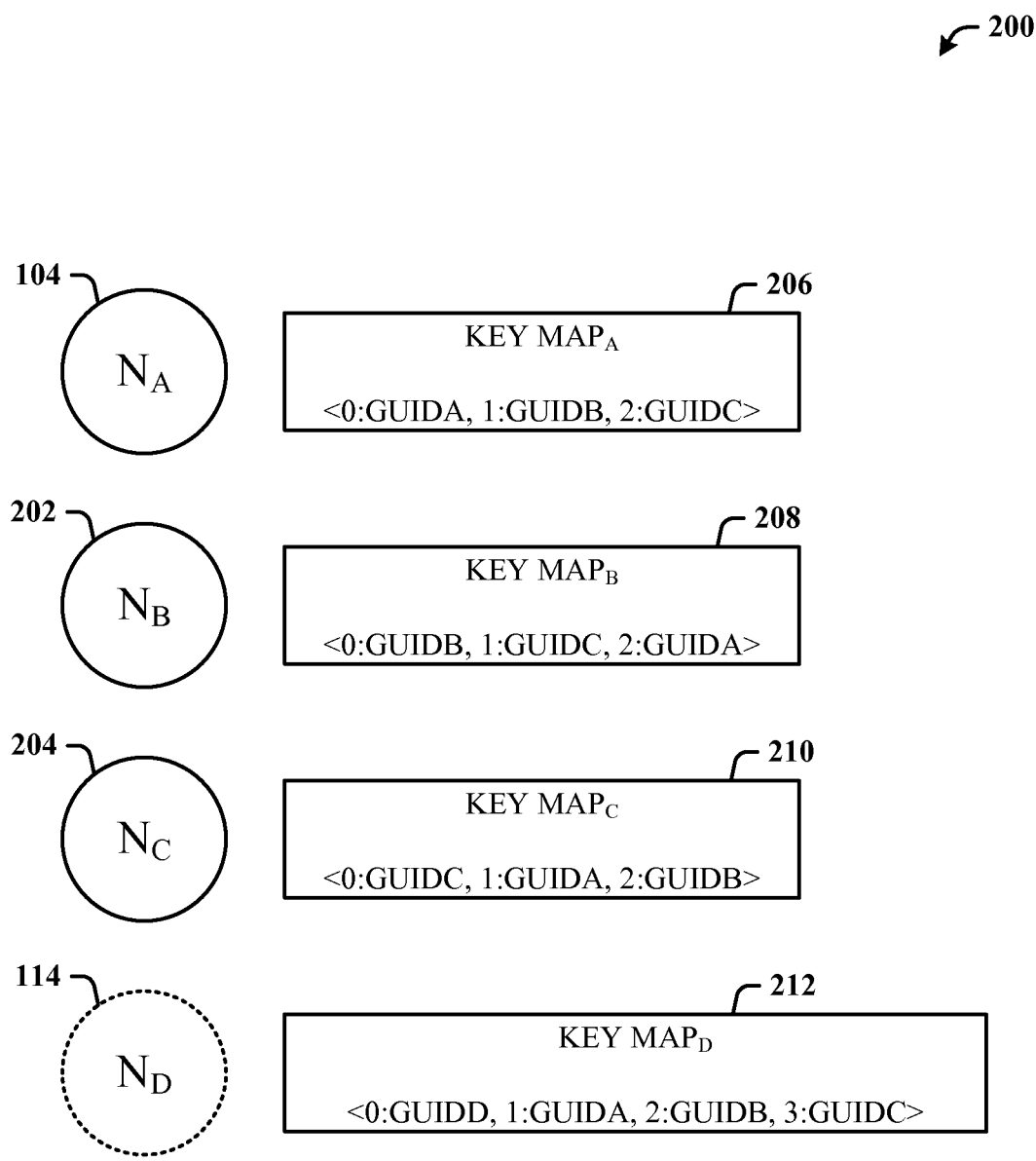
FIG. 2 illustrates the change to the identity of the node based on introduction of a new identity for the node.

FIG. 2 illustrates nodes and node key maps 200 and the change to the identity of the node 104 based on introduction of a new identity for the node. In one topology implementation knowledge objects include a replica key map that is used to identify nodes in a synchronization topology. The key map can be represented as a <key value, GUID identifier$_1$, GUID identifier$_2$, ..., GUID identifier$_N$> tuple, where N is the total number of nodes in the topology or an alphabetic designation in this example. A replica is a globally unique identifier (GUID) that a node self assigns. A key is an index into a list of replicas that is used locally by the node 104 to reference other node replicas.

Consider the topology 106 (of FIG. 1) that includes three nodes: node 104, node ($N_B$) 202, and node ($N_C$) 204. A replica key map 206 for node 104 can be (0:GuidA, 1:GuidB, 2:GuidC). This information indicates that there are three nodes in the topology: the node 104 (having the GUID identifier GuidA), node 202 (having the GUID identifier GuidB), and node 204 (having the GUID identifier GuidC). The key value zero for node 104 is the local peer value. Therefore, the replica for node 104 is GuidA.

The replica key maps for the remaining nodes are the following, showing three positions (0, 1, 2). The node 202 has a replica key map 208 (denoted (0:GuidB, 1:GuidC, 2:GuidA)) reflecting that the replica is GuidB, and the node 204 has a replica key map 210 (denoted (0:GuidC, 1:GuidA, 2:GuidB)) reflecting that the replica is GuidC.

After performing a restore of the data, the node replica is changed to reflect that this node is different (the new node 114) than the node that existed before restore. The reasons for doing this are so that data items altered by the new node 114 appear to be new to all other nodes (e.g., node 202 and node 204), and changes made by the "old" node 104 ("old" meaning the before restore replica) that were not captured in the backup, will flow back to the new node 114.

This is accomplished by redefining key zero in the replica key map 206 to be a new replica. This is performed by shifting the existing entries in the replica key map 206, to the right, for example, thereby increasing the map keys by one, and then inserting the new replica (GuidD) at position zero.

Thus, given the above example, pre-restore replica key map of node 104 is (0:GuidA, 1:GuidB, 2:GuidC), where GuidA is the local replica identifier. The post-restore replica key map 212 now include four positions (0, 1, 2, 3) and is (0:GuidD, 1:GuidA, 2:GuidB, 3GuidC), where GuidD is now the local replica identifier.

Since the versions for data items are stored in terms of (key, tickcount), where tickcount can be an integer, all item level metadata needs to have its associated key incremented by one to reflect the shift in the key map. Therefore, a data item that was created by replica GuidA and had a version of fifty is represented in the item metadata as (0, 50), where zero is the old replica key of the node 104. After the shift, this updated data item is reflected as (1, 50), since GuidA is now at position one in the key map.

This re-identification allows changes made by the new node replica GuidD to flow to other nodes, since GuidD appears to represent be a new node with new changes. This re-identification also allows changes made by the node 104 having GuidA to flow back to the new node 114 having replica GuidD, thereby allowing the changes made after the backup of the node 104 was taken to flow back and bring the restored node 104 back up to date.

Figure 3:
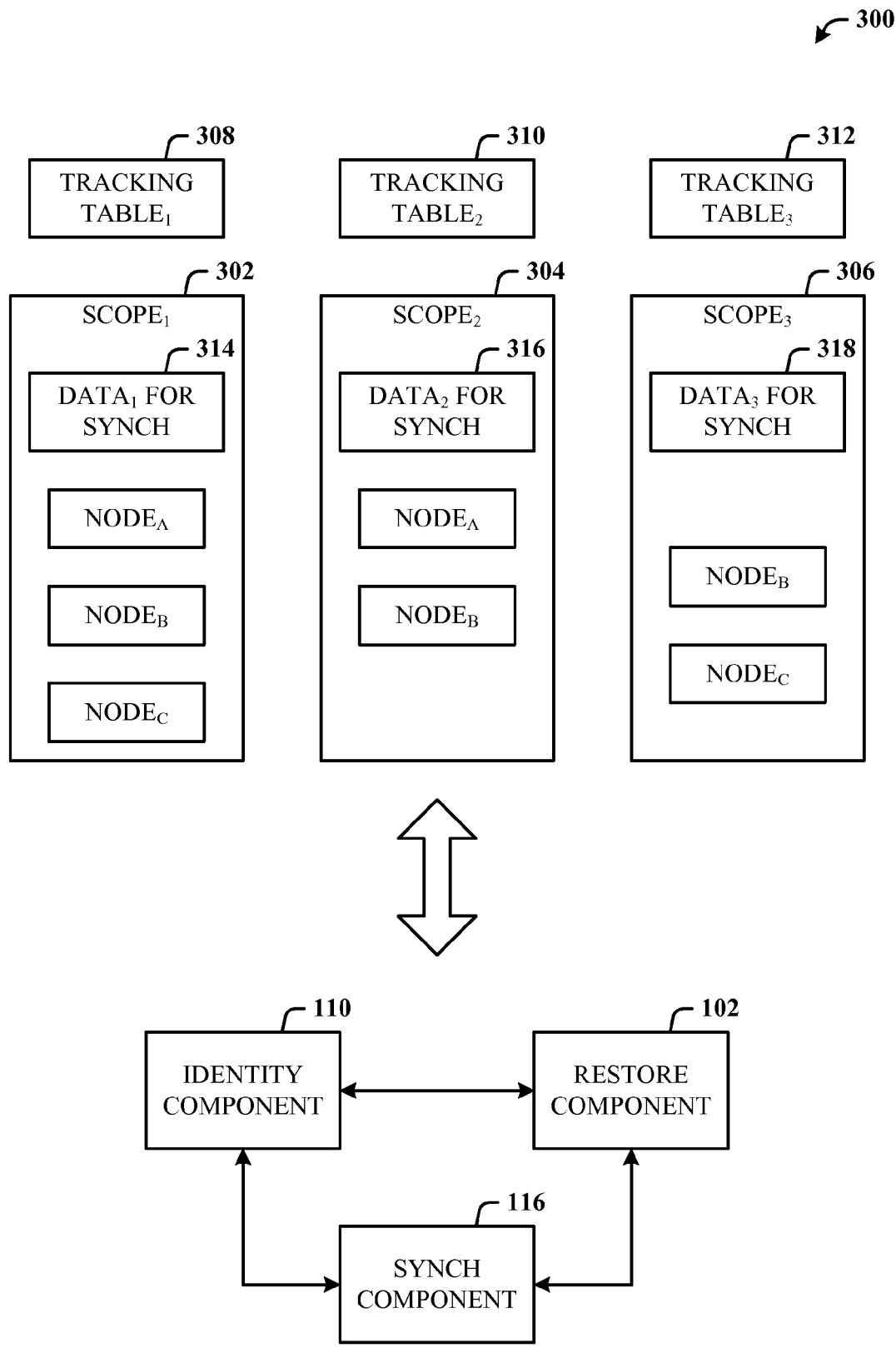
FIG. 3 illustrates a system that facilitates metadata update according to scope.

FIG. 3 illustrates a system 300 that facilitates metadata update according to scope. The restoration and synchronization framework defines a protocol for synchronizing a collection of nodes. For example, in one implementation, each unit (data item(s)) of synchronization is referred to as a "scope", and specifies the data that is to be synchronized. Nodes interested in a particular set of data are added to the scope that contains that data. All nodes within a scope synchronize the same set of data amongst themselves. This is achieved by maintaining version information about the data being synchronized.

When a node needs to be restored from backup due to hardware or software failure, the version information for the data that is stored on that node is repaired to prevent post-restore changes from being missed when sending changes to other nodes. Consider a node A, and that node A has sent out an item with version (A,50), where fifty is a local timestamp for time at which the change was made. If node A is restored to a point in time that causes its local timestamp to go backward (earlier in time) so as to precede fifty, such as (A,49), then any "new" changes created on that node will have the version (A,49) timestamp. This data then appears as old data to the other nodes that were synchronizing with this node prior to restore, thereby causing non-convergence.

This technique described above relative to node restore and updating applies as well to cross-scope metadata by updating the knowledge vector for every scope on the node. That is, redefine replica key zero to a new GUID, increment the existing keys by one, and then add one to all the key values that are stored in the side table.

When rows live in multiple scopes and changes were made in one scope, these changes are migrated as being made locally. Consider the following example where the scopes are Sales with a pre-remap key length of 4, 0-remap value of 5, and Customers scope with a pre-remap key length of 100, and 0-remap value of 101, where $R_1$ is a row, and $S_{1,2,3}$ are the scopes:

$R_1 \epsilon S_1, S_2, S_3$ $R_1 S_1 = (4,100)$ $R_1 S_2 = (0,10)$ $R_1 S_3 = (0,10)$ The row was actually changed in $S_1$; therefore, for the other scopes it appears the change came from the server (0).

After restore, the metadata will look like the following:

$R_1 \epsilon S_1, S_2, S_3$ $R_1 S_1 = (x, 100)$, where $x$ is the remapped 4 for $S_1$ $R_1 S_2 = (i, 10)$, where $i$ is the remapped 0 for $S_2$ $R_1 S_3 = (j, 10)$, where $j$ is the remapped 0 for $S_3$ In order avoid storing versions of the metadata for each scope, it is ensured that i=j such that inferring the ID is consistent and correct across scopes. This can be guaranteed by inserting a new replica key in the map at position zero and shifting all other keys to the right. This consistently maps zero to one across all scopes:

$n = 1$ $m = 1$ $K_{S1} = (k'_{10}, k_{10}, k_{11}, \ldots, k_{1n})$ $K_{S2} = (k'_{20}, k_{20}, k_{21}, \ldots, k_{2m})$ $k_{ij} = i$ is scope number, $j$ is the replica $id$ Replica ID zero becomes one; more generally, key i becomes i+1. Accordingly, in the example given above, the results are the following:

$R_1 \epsilon S_1, S_2, S_3$ $R_1 S_1 = (5, 100)$ $R_1 S_2 = (1, 10)$ $R_1 S_3 = (1, 10)$ In support of metadata updates, a example tracking table (knowledge vector) can include the following (per table metadata gets updated through triggers or as part of synchronization):

| <primary key of base table> | Primary key of base table | Updated on insert to base table |
|---|---|---|
| update_scope_local_id | The scope id that originated the change. Refers to the scope_local_id column in the scope_info table. | Updated when sync updates the metadata row. Updated with the scope local id associated with the sync. |
| scope_update_peer_key | For the scope that is the update_scope_local_id, the key ID of who made the update | Updated when change is applied from remote peer |
| scope_update_peer_timestamp | For the scope that is the update_scope_local_id, the version at ID that made the update | Updated when change is applied from remote peer |
| local_update_peer_key | For the scopes that are not update_scope_local_id, the key ID for proxying the update | Updated when change is applied from remote peer or through local DML |
| local_update_peer_timestamp | For the scopes that are not update_scope_local_id, the version at the proxying ID | Updated when change is applied from remote peer or through local DML |
| create_scope_local_id | The scope id that originated the item. Analogous to update_scope_local_id but for create version | Updated when an insert is applied from remote peer |
| scope_create_peer_key | Analogous to scope_update_peer_key but for inserts | Updated when an insert is applied from remote peer |
| scope_create_peer_timestamp | Analogous to scope_update_peer_timestamp but for inserts | Updated when change is inserted from remote peer or through local DML |
| local_create_peer_key | Analogous to local_update_peer_key but for inserts | Updated when change is inserted from remote peer or through local DML |
| local_create_peer_timestamp | Analogous to local_update_peer_timestamp but for inserts | Updated when change is inserted from remote peer or through local DML |
| sync_row_is_tombstone | Represents whether or not the row has been deleted from the base table | Updated on deletes on the base table |
| last_change_datetime | Stores the date and time when the metadata row was last updated | Any update to the metadata row changes this value. |
| restore_timestamp | This value stores the value of local_update_peer_timestamp at the time of restore, which is then used as the local update timestamp value. | Typically NULL but set by restore process. Set to NULL anytime a row is updated. |

The system 300 depicts three scopes: a first scope 302, a second scope 304, and a third scope 306. The three scopes have corresponding tracking tables: first tracking table 308, second tracking table 310 and third tracking table 312. Each scope is associated data for synchronization: a first set of data 314, a second set of data 316, and a third set of data 318.

Here, the nodes listed in association with the first scope 302 include $Node_A$, $Node_B$, and $Node_C$, which nodes will synch the first set of data 314. Similarly, the nodes listed in association with the second scope 304 include $Node_A$ and $Node_B$, which nodes will synch the second set of data 316. The nodes listed in association with the third scope 306 include $Node_B$ and $Node_C$, which nodes will synch the third set of data 318. The tracking tables (308, 310, and 312) track the knowledge vector and changes thereto for each respective scope 302, 304, and 306), pre-restore, and post-restore, as facilitates by the restore component 102, identity component 110, and synch component 116.

Included herein is a set of flow charts representative of exemplary methodologies for performing novel aspects of the disclosed architecture. While, for purposes of simplicity of explanation, the one or more methodologies shown herein, for example, in the form of a flow chart or flow diagram, are shown and described as a series of acts, it is to be understood and appreciated that the methodologies are not limited by the order of acts, as some acts may, in accordance therewith, occur in a different order and/or concurrently with other acts from that shown and described herein. For example, those skilled in the art will understand and appreciate that a methodology could alternatively be represented as a series of interrelated states or events, such as in a state diagram. Moreover, not all acts illustrated in a methodology may be required for a novel implementation.

Figure 4:
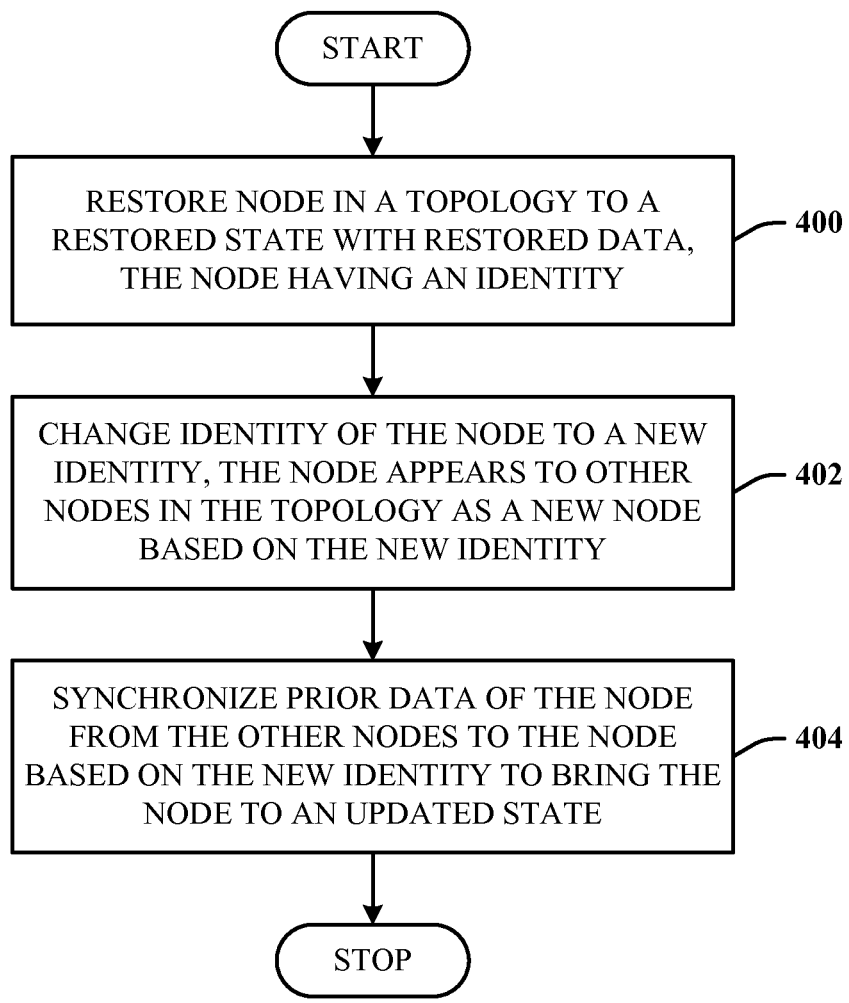
FIG. 4 illustrates a computer-implemented data restoration method in accordance with the disclosed architecture.

FIG. 4 illustrates a computer-implemented data restoration method in accordance with the disclosed architecture. At 400, a node in a topology is restored to a restored state with restored data. Each node in the topology has an associated identity. At 402, the identity of the node is changed to a new identity. The node then appears to other nodes in the topology as a new node having the new identity. At 404, prior data of the node is synchronized from the other nodes to the node based on the new identity to bring the node to an updated state.

Figure 5:
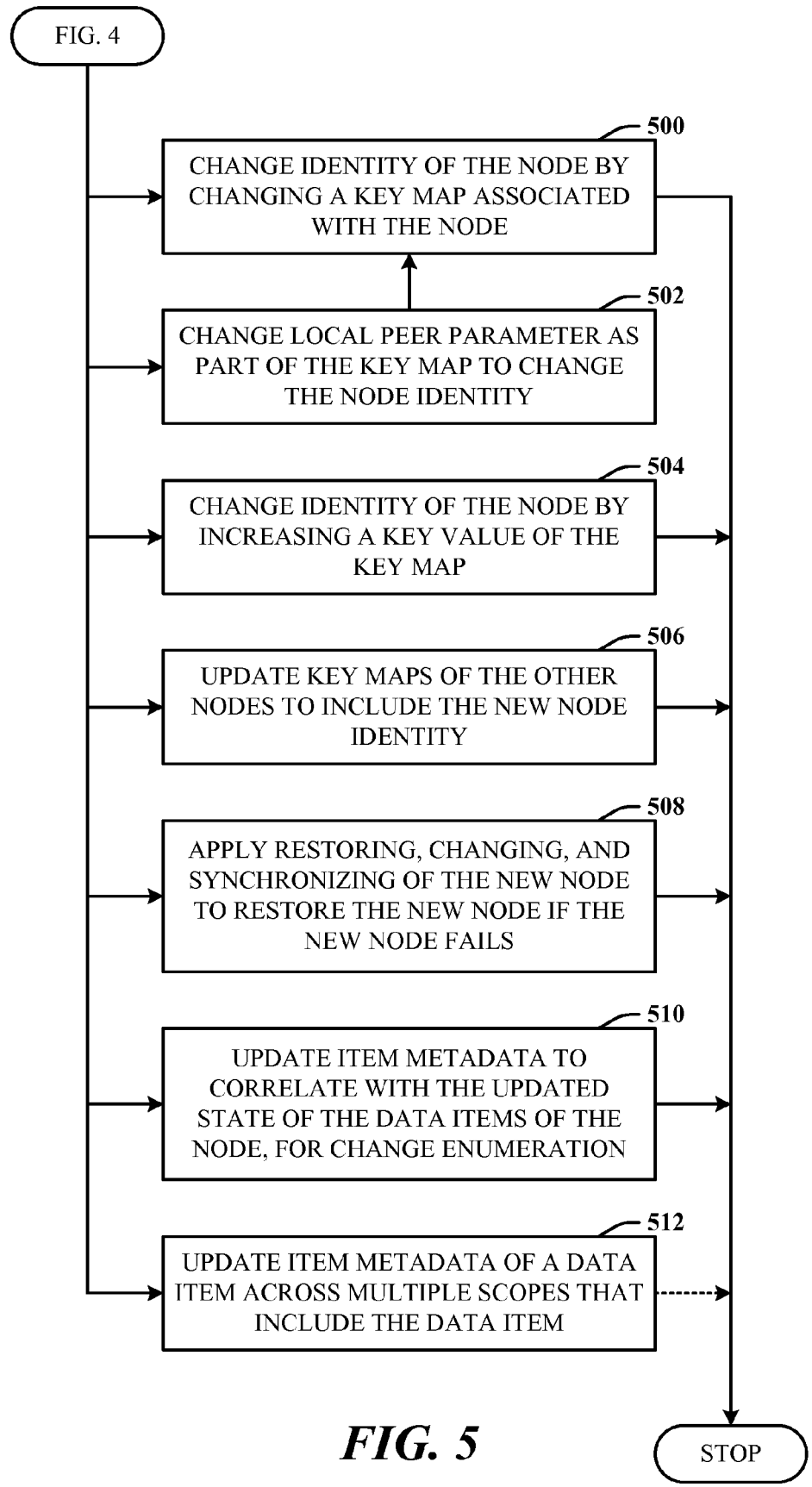
FIG. 5 illustrates further aspects of the method of FIG. 4.

FIG. 5 illustrates further aspects of the method of FIG. 4. At 500, the identity of the node is changed by changing a key map associated with the node. At 502, a local peer parameter as part of the key map is changed to change the node identity. At 504, the identity of the node is changed by increasing a key value of the key map. At 506, key maps of the other nodes are updated to include the new node identity. At 508, restoring, changing, and synchronizing of the new node is applied to restore the new node if the new node fails. At 510, item metadata is updated to correlate with the updated state of the data items of the node, for change enumeration. At 512, item metadata of a data item is updated across multiple scopes that include the data item.

Figure 6:
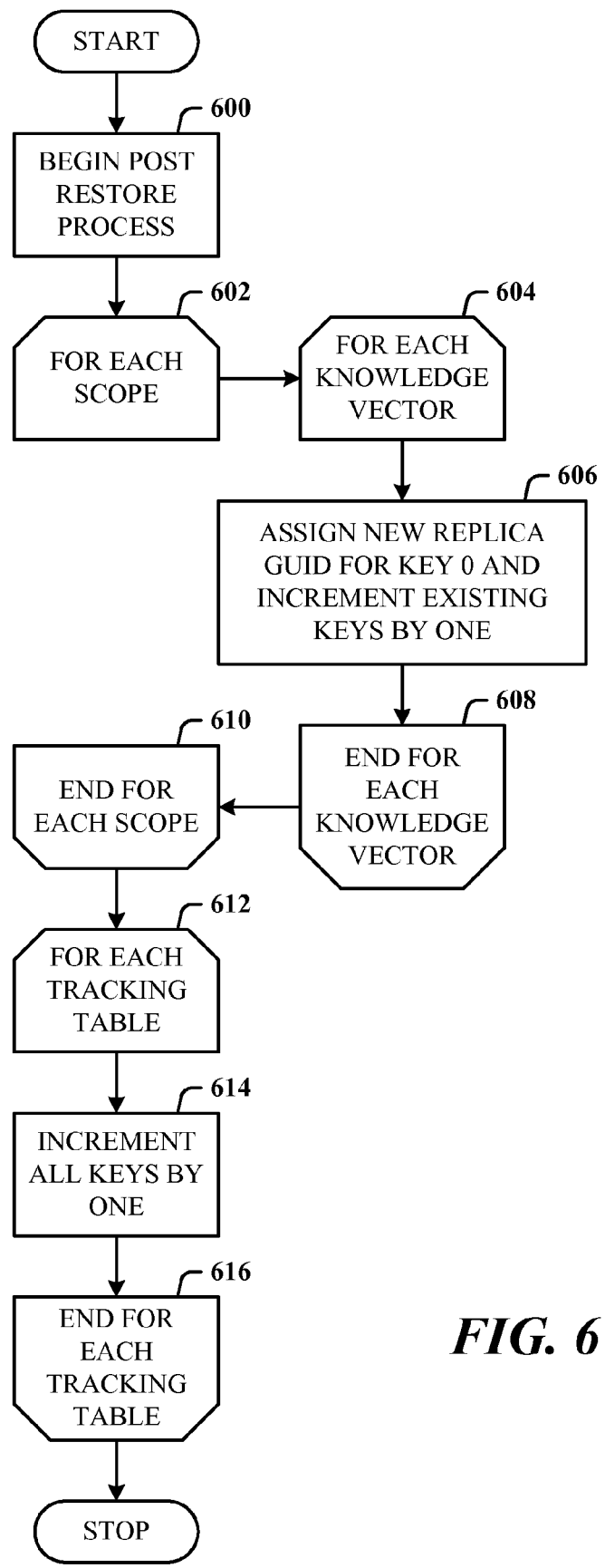
FIG. 6 illustrates an alternative data restoration method beginning with the post-restore process.

FIG. 6 illustrates an alternative data restoration method beginning with the post-restore process. At 600, the post-restore process begins. At 602, processing is performed for each scope. At 604, for each knowledge vector, a new replica is assigned for key zero and existing keys are incremented by one, as indicated at 606. At 608, the knowledge vector updates are concluded. At 610, the knowledge vector updating ends for each scope. At 612, updating is initiated for each tracking table. At 614, all keys in the tracking table are incremented. At 616, tracking table updates are concluded.

Figure 7:
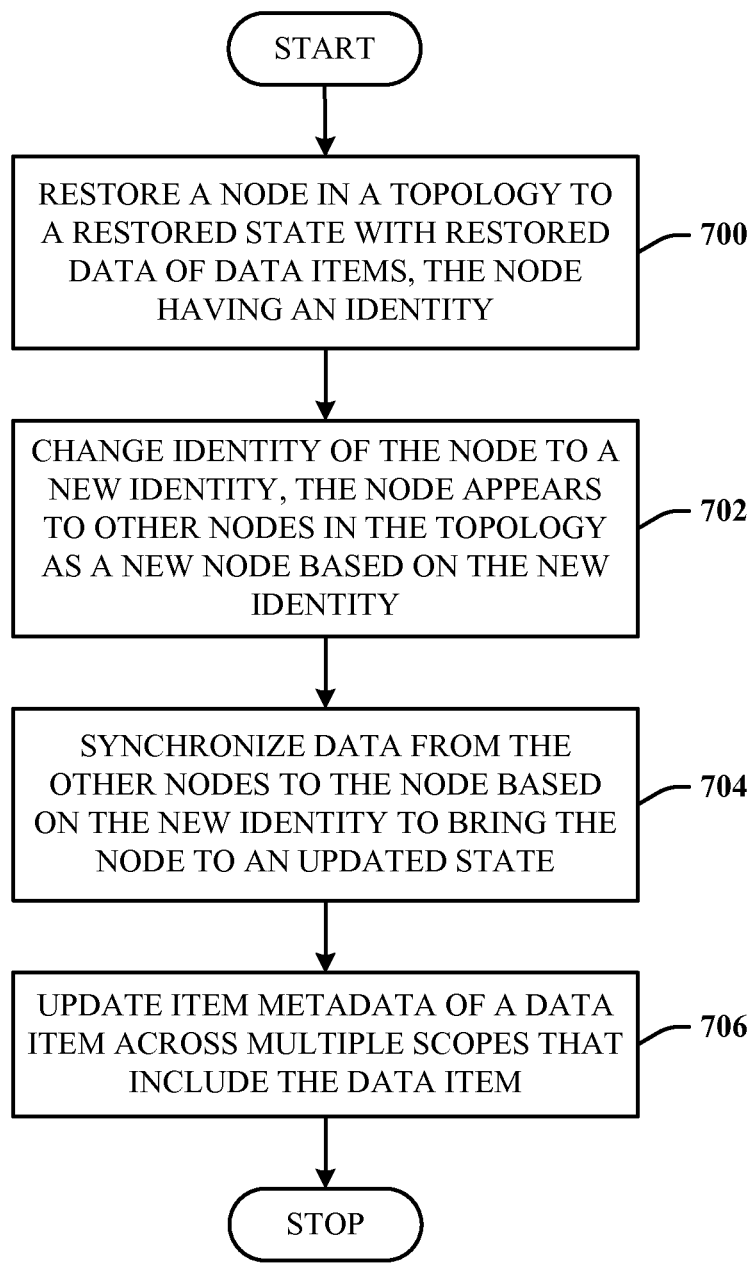
FIG. 7 illustrates an alternative data restoration method in accordance with the disclosed architecture.

FIG. 7 illustrates an alternative data restoration method in accordance with the disclosed architecture. At 700, a node in a topology is restored to a restored state with restored data of data items, the node having an identity. At 702, the identity of the node is changed to a new identity. The node appears to other nodes in the topology as a new node based on the new identity. At 704, data is synchronized from the other nodes to the node based on the new identity to bring the node to an updated state. At 706, item metadata of a data item is updated across multiple scopes that include the data item.

Figure 8:
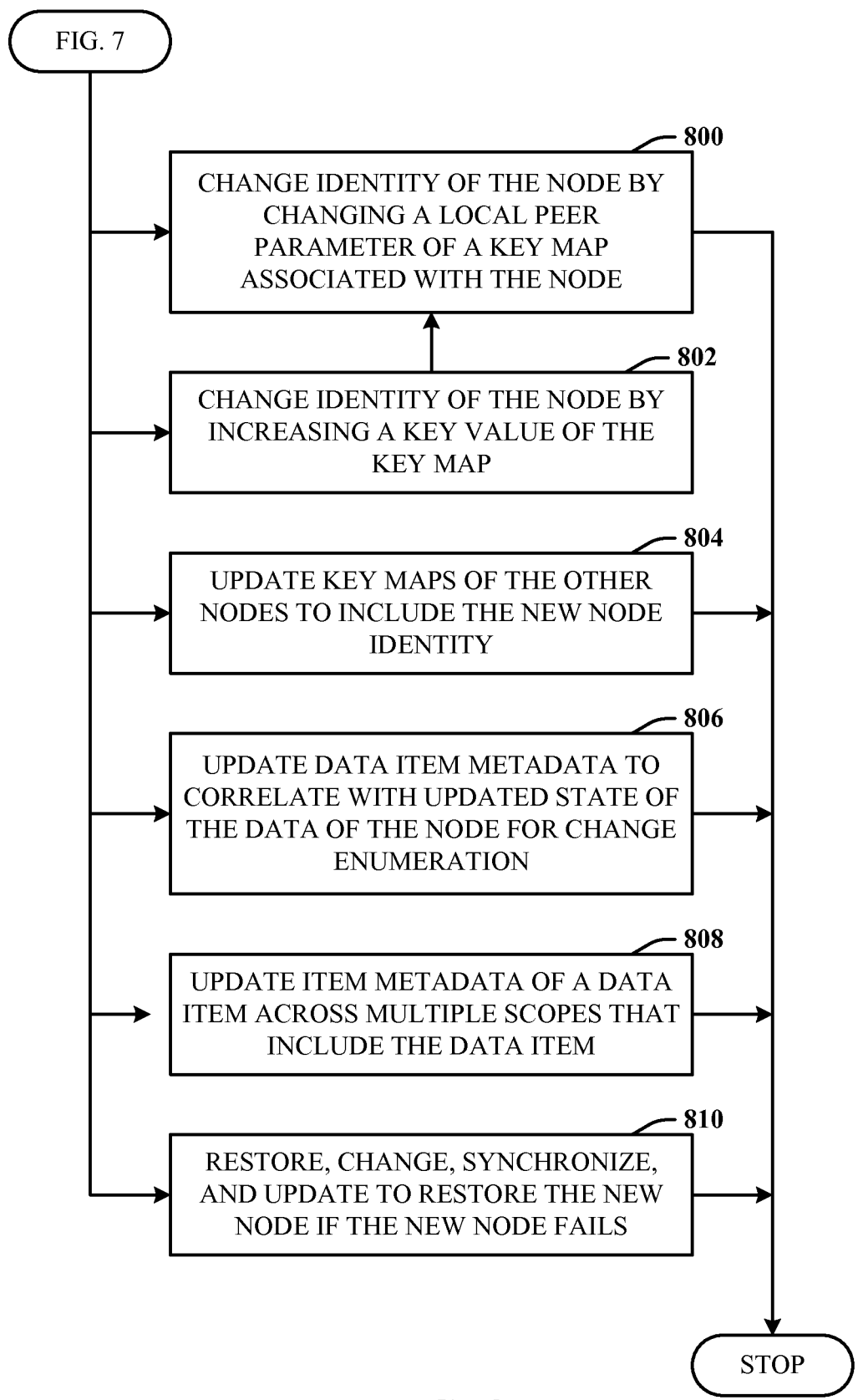
FIG. 8 illustrates further aspects of the method of FIG. 7.

FIG. 8 illustrates further aspects of the method of FIG. 7. At 800, the identity of the node is changed by changing a local peer parameter of a key map associated with the node. At 802, the identity of the node is changed by increasing a key value of the key map. At 804, key maps of the other nodes are updated to include the new node identity. At 806, data item metadata is updated to correlate with updated state of the data of the node for change enumeration. At 808, item metadata of a data item is updated across multiple scopes that include the data item. At 810, restoring, changing, synchronizing, and updating are applied to restore the new node if the new node fails.

As used in this application, the terms "component" and "system" are intended to refer to a computer-related entity, either hardware, a combination of software and tangible hardware, software, or software in execution. For example, a component can be, but is not limited to, tangible components such as a processor, chip memory, mass storage devices (e.g., optical drives, solid state drives, and/or magnetic storage media drives), and computers, and software components such as a process running on a processor, an object, an executable, module, a thread of execution, and/or a program. By way of illustration, both an application running on a server and the server can be a component. One or more components can reside within a process and/or thread of execution, and a component can be localized on one computer and/or distributed between two or more computers. The word "exemplary" may be used herein to mean serving as an example, instance, or illustration. Any aspect or design described herein as "exemplary" is not necessarily to be construed as preferred or advantageous over other aspects or designs.

Figure 9:
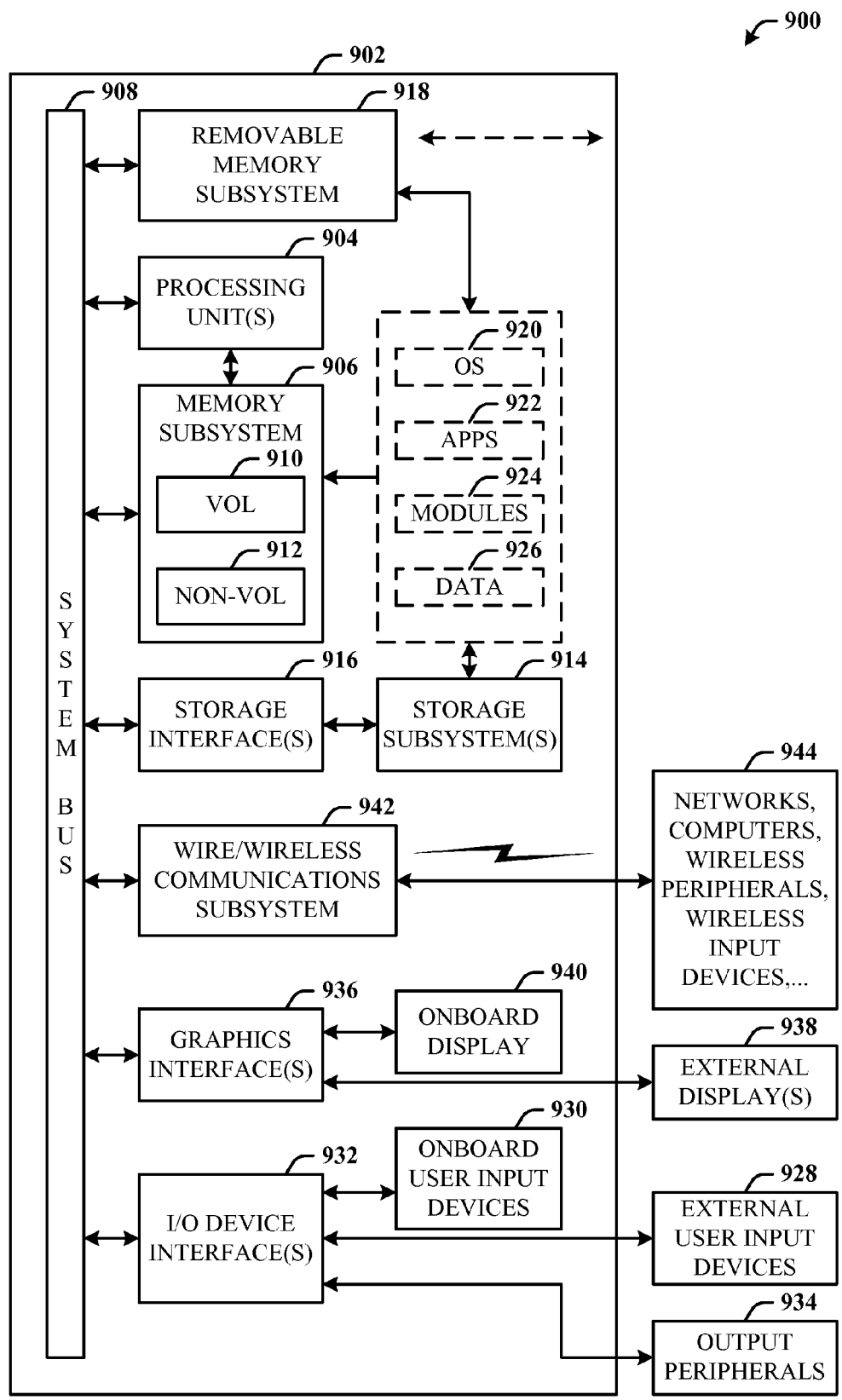
FIG. 9 illustrates a block diagram of a computing system that executes node restoration and synchronization in accordance with the disclosed architecture.

Referring now to FIG. 9, there is illustrated a block diagram of a computing system 900 that executes node restoration and synchronization in accordance with the disclosed architecture. In order to provide additional context for various aspects thereof, FIG. 9 and the following description are intended to provide a brief, general description of the suitable computing system 900 in which the various aspects can be implemented. While the description above is in the general context of computer-executable instructions that can run on one or more computers, those skilled in the art will recognize that a novel embodiment also can be implemented in combination with other program modules and/or as a combination of hardware and software.

The computing system 900 for implementing various aspects includes the computer 902 having processing unit(s) 904, a computer-readable storage such as a system memory 906, and a system bus 908. The processing unit(s) 904 can be any of various commercially available processors such as single-processor, multi-processor, single-core units and multi-core units. Moreover, those skilled in the art will appreciate that the novel methods can be practiced with other computer system configurations, including minicomputers, mainframe computers, as well as personal computers (e.g., desktop, laptop, etc.), hand-held computing devices, microprocessor-based or programmable consumer electronics, and the like, each of which can be operatively coupled to one or more associated devices.

The system memory 906 can include computer-readable storage (physical storage media) such as a volatile (VOL) memory 910 (e.g., random access memory (RAM)) and non-volatile memory (NON-VOL) 912 (e.g., ROM, EPROM, EEPROM, etc.). A basic input/output system (BIOS) can be stored in the non-volatile memory 912, and includes the basic routines that facilitate the communication of data and signals between components within the computer 902, such as during startup. The volatile memory 910 can also include a high-speed RAM such as static RAM for caching data.

The system bus 908 provides an interface for system components including, but not limited to, the system memory 906 to the processing unit(s) 904. The system bus 908 can be any of several types of bus structure that can further interconnect to a memory bus (with or without a memory controller), and a peripheral bus (e.g., PCI, PCIe, AGP, LPC, etc.), using any of a variety of commercially available bus architectures.

The computer 902 further includes machine readable storage subsystem(s) 914 and storage interface(s) 916 for interfacing the storage subsystem(s) 914 to the system bus 908 and other desired computer components. The storage subsystem(s) 914 (physical storage media) can include one or more of a hard disk drive (HDD), a magnetic floppy disk drive (FDD), and/or optical disk storage drive (e.g., a CD-ROM drive DVD drive), for example. The storage interface(s) 916 can include interface technologies such as EIDE, ATA, SATA, and IEEE 1394, for example.

One or more programs and data can be stored in the memory subsystem 906, a machine readable and removable memory subsystem 918 (e.g., flash drive form factor technology), and/or the storage subsystem(s) 914 (e.g., optical, magnetic, solid state), including an operating system 920, one or more application programs 922, other program modules 924, and program data 926.

The one or more application programs 922, other program modules 924, and program data 926 can include the entities and components of the system 100 of FIG. 1, the nodes and key maps 200 of FIG. 2, the entities and components of the system 300 of FIG. 3, and the methods represented by the flowcharts of FIGS. 4-8, for example.

Generally, programs include routines, methods, data structures, other software components, etc., that perform particular tasks or implement particular abstract data types. All or portions of the operating system 920, applications 922, modules 924, and/or data 926 can also be cached in memory such as the volatile memory 910, for example. It is to be appreciated that the disclosed architecture can be implemented with various commercially available operating systems or combinations of operating systems (e.g., as virtual machines).

The storage subsystem(s) 914 and memory subsystems (906 and 918) serve as computer readable media for volatile and non-volatile storage of data, data structures, computer-executable instructions, and so forth. The instructions can exist on non-transitory media. Such instructions, when executed by a computer or other machine, can cause the computer or other machine to perform one or more acts of a method. The instructions to perform the acts can be stored on one medium, or could be stored across multiple media, so that the instructions appear collectively on the one or more computer-readable storage media, regardless of whether all of the instructions are on the same media.

Computer readable media can be any available media that can be accessed by the computer 902 and includes volatile and non-volatile internal and/or external media that is removable or non-removable. For the computer 902, the media accommodate the storage of data in any suitable digital format. It should be appreciated by those skilled in the art that other types of computer readable media can be employed such as zip drives, magnetic tape, flash memory cards, flash drives, cartridges, and the like, for storing computer executable instructions for performing the novel methods of the disclosed architecture.

A user can interact with the computer 902, programs, and data using external user input devices 928 such as a keyboard and a mouse. Other external user input devices 928 can include a microphone, an IR (infrared) remote control, a joystick, a game pad, camera recognition systems, a stylus pen, touch screen, gesture systems (e.g., eye movement, head movement, etc.), and/or the like. The user can interact with the computer 902, programs, and data using onboard user input devices 930 such a touchpad, microphone, keyboard, etc., where the computer 902 is a portable computer, for example. These and other input devices are connected to the processing unit(s) 904 through input/output (I/O) device interface(s) 932 via the system bus 908, but can be connected by other interfaces such as a parallel port, IEEE 1394 serial port, a game port, a USB port, an IR interface, etc. The I/O device interface(s) 932 also facilitate the use of output peripherals 934 such as printers, audio devices, camera devices, and so on, such as a sound card and/or onboard audio processing capability.

One or more graphics interface(s) 936 (also commonly referred to as a graphics processing unit (GPU)) provide graphics and video signals between the computer 902 and external display(s) 938 (e.g., LCD, plasma) and/or onboard displays 940 (e.g., for portable computer). The graphics interface(s) 936 can also be manufactured as part of the computer system board.

The computer 902 can operate in a networked environment (e.g., IP-based) using logical connections via a wired/wireless communications subsystem 942 to one or more networks and/or other computers. The other computers can include workstations, servers, routers, personal computers, microprocessor-based entertainment appliances, peer devices or other common network nodes, and typically include many or all of the elements described relative to the computer 902. The logical connections can include wired/wireless connectivity to a local area network (LAN), a wide area network (WAN), hotspot, and so on. LAN and WAN networking environments are commonplace in offices and companies and facilitate enterprise-wide computer networks, such as intranets, all of which may connect to a global communications network such as the Internet.

When used in a networking environment the computer 902 connects to the network via a wired/wireless communication subsystem 942 (e.g., a network interface adapter, onboard transceiver subsystem, etc.) to communicate with wired/wireless networks, wired/wireless printers, wired/wireless input devices 944, and so on. The computer 902 can include a modem or other means for establishing communications over the network. In a networked environment, programs and data relative to the computer 902 can be stored in the remote memory/storage device, as is associated with a distributed system. It will be appreciated that the network connections shown are exemplary and other means of establishing a communications link between the computers can be used.

The computer 902 is operable to communicate with wired/wireless devices or entities using the radio technologies such as the IEEE 802.xx family of standards, such as wireless devices operatively disposed in wireless communication (e.g., IEEE 802.11 over-the-air modulation techniques) with, for example, a printer, scanner, desktop and/or portable computer, personal digital assistant (PDA), communications satellite, any piece of equipment or location associated with a wirelessly detectable tag (e.g., a kiosk, news stand, restroom), and telephone. This includes at least Wi-Fi (or Wireless Fidelity) for hotspots, WiMax, and Bluetooth™ wireless technologies. Thus, the communications can be a predefined structure as with a conventional network or simply an ad hoc communication between at least two devices. Wi-Fi networks use radio technologies called IEEE 802.11x (a, b, g, etc.) to provide secure, reliable, fast wireless connectivity. A Wi-Fi network can be used to connect computers to each other, to the Internet, and to wire networks (which use IEEE 802.3-related media and functions).

The illustrated and described aspects can be practiced in distributed computing environments where certain tasks are performed by remote processing devices that are linked through a communications network. In a distributed computing environment, program modules can be located in local and/or remote storage and/or memory system.

What has been described above includes examples of the disclosed architecture. It is, of course, not possible to describe every conceivable combination of components and/or methodologies, but one of ordinary skill in the art may recognize that many further combinations and permutations are possible. Accordingly, the novel architecture is intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A computer-implemented data restoration system, comprising:
    a processor configured to process data;
    a data storage device configured to store instructions which, upon execution by the processor, control the data restoration system to perform acts of:
    restoring an earlier version of node data to an original node, the original node having an original identity;
    changing the original identity of the original node to a new identity, the new identity of the original node enables the original node to appear as a new node to other nodes, the new node maintains the restored earlier version of the node data of the original node; and
    synchronizing changes from the new node to the other nodes and changes from the other nodes to the new node based on the new identity, to enable capture of changes made since the earlier version.

2. The system of claim 1, wherein the data restoration system is controlled to perform an act of changing the identity of the node by increasing a local peer value of a key map associated with the node, and updates key maps of all topology nodes based on the new identity.

3. The system of claim 1, wherein the data restoration system is controlled to perform an act of synchronizing data changes from the node to the other nodes and synchronizing changes from the other nodes to the node based on the new identity.

4. The system of claim 1, wherein the data restoration system is controlled to perform an act of creating the new identity as an incremental increase in a local peer value and new node identifier.

5. The system of claim 1, wherein the data restoration system is controlled to perform an act of restoring data item metadata based on the restored node, and data item metadata across scopes that include the data item.

6. A computer-implemented data restoration method, comprising acts of:
    restoring an earlier version of node data an original node, the original node having an original identity;
    changing the original identity of the original node to a new identity, the new identity of the original node enables the original node to appear as a new node to other nodes, the new node maintains the restored earlier version of the node data of the original node; and
    synchronizing changes from the new node to the other nodes and changes from the other nodes to the new node based on the new identity, to enable capture of changes made since the earlier version.

7. The method of claim 6, further comprising changing the identity of the node by changing a key map associated with the node.

8. The method of claim 7, further comprising changing a local peer parameter as part of the key map to change the node identity.

9. The method of claim 7, further comprising changing the identity of the node by increasing a key value of the key map.

10. The method of claim 6, further comprising updating key maps of the other nodes to include the new node identity.

11. The method of claim 6, further comprising applying restoring, changing, and synchronizing of the new node to restore the new node if the new node fails.

12. The method of claim 6, further comprising updating item metadata to correlate with the updated state of the data items of the node, for change enumeration.

13. The method of claim 6, further comprising updating item metadata of a data item across multiple scopes that include the data item.

14. The method of claim 6, wherein restoring comprises repairing version information for data stored on a respective node to prevent post-restore changes from being missed when sending changes to other nodes.

15. A computer-readable physical hardware storage medium comprising computer-executable instructions that when executed by a processor, cause the processor to perform acts of:
    as part of a synchronization process, restoring an earlier version of node data to an original node, the original node having an original identity;
    changing the original identity of the original node to a new identity as part of the synchronization process, the new identity of the original node enables the original node to appear as a new node to other nodes, the new node maintains the restored earlier version of the node data of the original node; and
    synchronizing changes from the new node to the other nodes and changes from the other nodes to the new node based on the new identity, to enable capture of changes made since the earlier version.

16. The computer-readable physical hardware storage medium of claim 15, further comprising changing the identity of the node by changing a local peer parameter of a key map associated with the node.

17. The computer-readable physical hardware storage medium of claim 15, further comprising changing the identity of the node by increasing a key value of the key map.

18. The computer-readable physical hardware storage medium of claim 15, further comprising updating data item metadata to correlate with updated state of the data of the node for change enumeration.

19. The computer-readable physical hardware storage medium of claim 15, further comprising updating item metadata of a data item across multiple scopes that include the data item.

20. The computer-readable physical hardware storage medium of claim 15, further comprising restoring, changing, synchronizing, and updating to restore the new node when the new node fails.

\* \* \* \* \*